United States Patent
Bulthuis et al.

(10) Patent No.: US 10,684,415 B1
(45) Date of Patent: Jun. 16, 2020

(54) OPTICAL TRANSCEIVER

(71) Applicant: Broadex Technologies UK Limited, Livingston (GB)

(72) Inventors: Hindrik Freerk Bulthuis, Apeldoorn (NL); Lucas Soldano, Iseo (IT); Ramsey Selim, Edinburgh (GB)

(73) Assignee: Broadex Technologies UK Limited, Livingston (GB)

( * ) Notice: Subject to any disclaimer, the term of this patent is extended or adjusted under 35 U.S.C. 154(b) by 0 days.

(21) Appl. No.: 15/369,649

(22) Filed: Dec. 5, 2016

Related U.S. Application Data

(60) Provisional application No. 62/263,537, filed on Dec. 4, 2015.

(51) Int. Cl.
*G02B 6/124* (2006.01)
*G02B 6/12* (2006.01)
*G02B 6/14* (2006.01)
*G02B 6/125* (2006.01)

(52) U.S. Cl.
CPC ............. *G02B 6/124* (2013.01); *G02B 6/125* (2013.01); *G02B 6/12016* (2013.01); *G02B 6/14* (2013.01); *G02B 2006/12104* (2013.01); *G02B 2006/12147* (2013.01)

(58) Field of Classification Search
CPC ...... G02B 6/124; G02B 6/12016; G02B 6/14; G02B 6/125
See application file for complete search history.

(56) References Cited

U.S. PATENT DOCUMENTS

| | | | | |
|---|---|---|---|---|
| 5,894,538 | A * | 4/1999 | Presby | G02B 6/122 385/123 |
| 7,366,380 | B1 * | 4/2008 | Peterson | G02B 6/4214 385/47 |
| 9,341,786 | B1 * | 5/2016 | Gamache | G02B 6/30 |
| 9,484,482 | B2 * | 11/2016 | Hsu | G02B 6/4214 |
| 2003/0059190 | A1 | 3/2003 | Gunn et al. | |
| 2003/0077025 | A1 * | 4/2003 | Zhang | G02B 6/124 385/17 |

(Continued)

OTHER PUBLICATIONS

Strasser et al., Reflective-mode conversion with UV-induced phase gratings in two-mode fiber, 1997, OFC '97 Technical Digest, pp. 348-349.*

(Continued)

*Primary Examiner* — Ryan A Lepisto
*Assistant Examiner* — Erin D Chiem
(74) *Attorney, Agent, or Firm* — Haynes Beffel & Wolfeld LLP; Andrew L. Dunlap; Warren S. Wolfeld

(57) ABSTRACT

Roughly described, an integrated optical device includes both a PLC chip and an attached SiPh chip. The PLC chip has a PLC waveguide which terminates at an end facet. The SiPh chip has a SiPh waveguide which includes a Bragg grating which diffracts light from the SiPh waveguide toward the PLC chip. The PLC chip also has a turning mirror to reflect light emitted from the Bragg grating onto the end facet of the PLC waveguide. The Bragg grating is designed to direct light emitted from the Bragg grating into the end facet of the PLC waveguide so that after reflecting off the turning mirror the light focuses within one Rayleigh distance of the end facet of the PLC chip.

14 Claims, 14 Drawing Sheets

(56) References Cited

U.S. PATENT DOCUMENTS

| | | | |
|---|---|---|---|
| 2004/0156589 A1* | 8/2004 | Gunn, III | G02B 6/12004 385/37 |
| 2011/0142395 A1* | 6/2011 | Fortusini | G02B 6/34 385/37 |
| 2013/0209026 A1* | 8/2013 | Doany | G02B 6/4214 385/14 |
| 2016/0109659 A1* | 4/2016 | Jiang | G02B 6/305 385/14 |
| 2016/0327742 A1* | 11/2016 | Collins | G02B 6/1228 |
| 2017/0207600 A1* | 7/2017 | Klamkin | H01S 5/02292 |

OTHER PUBLICATIONS

Li et al., "Silicon photonics packaging with lateral fiber coupling to apodized grating coupler embedded circuit," Optics Express 24235-24240, Oct. 6, 2014, vol. 22, No. 20.

Li et al., "CMOS-compatible high efficiency double-etched apodized waveguide grating coupler", Optics Express, vol. 21, Issue 7, pp. 7868-7874, Apr. 8, 2013.

AD-net Technology Co., LTD, "Difference between single mode fiber and multi mode fiber," https://www.ad-net.com.tw/difference-between-single-mode-fiber-and-multi-mode-fiber/, 9 pages, Jun. 10, 2006.

* cited by examiner

OPTICAL TRANSCEIVER

CROSS REFERENCE TO RELATED APPLICATION

This application claims priority under 35 U.S.C. § 119(e) to U.S. Provisional Application No. 62/263,537, entitled "OPTICAL TRANSCEIVER", filed on Dec. 4, 2015, by Hendrik Freerk Bulthuis, Lucas Soldano, and Ramsey Selim, the entire contents of which are hereby incorporated by reference herein.

BACKGROUND

Field of the Technology

The present technology generally relates optical transceiver technology, and more generally to devices combining both silicon photonics and planar lightwave circuit chips.

Description of Related Art

Silicon photonic (SiPh) chips and planar lightwave circuit (PLC) chips both have the characteristics of low optical loss and low index contrast and therefore often are connected to fibers/lasers for optical data transmission.

The SiPh chips typically are characterized by much smaller modes and smaller footprint, which leads to low tolerance of misalignment to fibers/lasers. As such, SiPh chips typically would require demanding alignment techniques to achieve high coupling efficiency to fibers or lasers. SiPh chips typically are capable of high speed detection and modulation, but usually not of passive multiplexing and demultiplexing. PLC chips, on the other hand, typically are good at coupling to fibers and lasers and often have good capability for multiplexing and demultiplexing.

It is desirable to provide a transceiver and other devices addressing high speed detection and modulation, performing multiplexing and demultiplexing, and achieving efficient coupling of the SiPh chip to PLC chip with low optical loss.

SUMMARY

An opportunity therefore arises to create robust solutions to the problem of creating optical devices, which incorporate components in each type of chip which are best performed in that type of chip. Better optical components and systems may result.

Roughly described, the invention involves an integrated optical device includes both a PLC chip and an attached SiPh chip. The PLC chip has a PLC waveguide which terminates at an end facet. The SiPh chip has a SiPh waveguide which includes a Bragg grating which diffracts light from the SiPh waveguide toward the PLC chip. The PLC chip also has a turning mirror to reflect light emitted from the Bragg grating onto the end facet of the PLC waveguide. The Bragg grating is designed to direct light emitted from the Bragg grating into the end facet of the PLC waveguide so that after reflecting off the turning mirror the light focuses within one Rayleigh distance of the end facet of the PLC chip.

In another aspect of the invention, roughly described, the PLC waveguide and the SiPh waveguide both support more than one mode in their respective transverse dimensions.

In yet another aspect of the invention, roughly described, the coupling of the PLC waveguide to the SiPh waveguide includes a mode field converter configured to convert light having one mode field shape in the PLC waveguide to light having a different mode field shape in the SiPh waveguide and vice-versa.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DESCRIPTION

Figure 1:
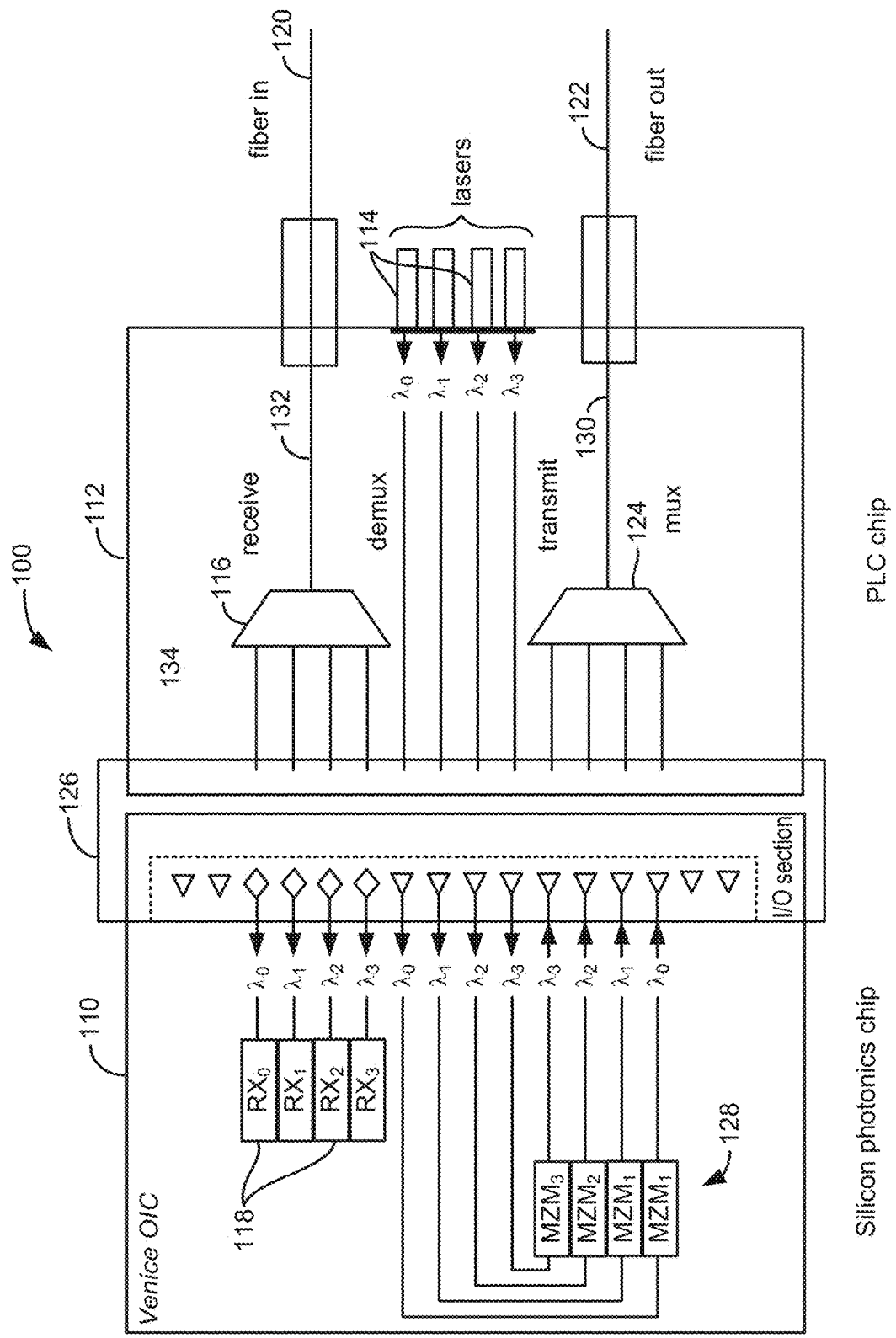
FIG. 1 illustrates a schematic diagram of a coarse wavelength division multiplexing (CWDM) transceiver 100 incorporating aspects of the invention.

FIG. 1 illustrates a schematic diagram of a coarse wavelength division multiplexing (CWDM) transceiver 100 incorporating aspects of the invention. The CWDM transceiver comprises both a silicon photonics (SiPh) chip 110 and a planar lightwave circuit (PLC) chip 112. The transceiver 100 has a transmit side, comprising four source lasers 114 carrying, for example, four wavelength channels $\lambda_0$, $\lambda_1$, $\lambda_2$, and $\lambda_3$. The four lasers are coupled to the PLC chip 112, then coupled from the PLC chip 112 to the SiPh chip 110, where they drive four respective Mach-Zehnder modulators 128 integrated into the SiPh chip 110. Modulated channel outputs are then coupled back onto the PLC chip 112, where they are multiplexed onto a single waveguide 130 by a passive multiplexer 124. The light from waveguide 130 is then coupled onto an output fiber 122. The transceiver 100 also has a receive side which has an optical input waveguide 132 coupled to receive light from an input fiber 120, and provide it to a demultiplexer 116 which demultiplexes the four wavelength channels. The four separated channels on separate PLC waveguides are then coupled onto the SiPh chip where they are input to four respective photo detectors 118 on the SiPh chip 110. Optical signals are coupled between the two chips 110 and 112 by couplers represented symbolically by rectangle 126 in FIG. 1, and described in more detail hereinafter.

The PLC chip 112 is a fabricated using a low loss and low contrast technology like Silica on Silicon or SiON technology that has good capability for passive integrated optics such as multiplexing and demultiplexing as well as coupling to fibers and lasers. The SiPh chip 110 is characterized by much smaller modes and smaller footprint, but is not good at coupling to lasers and not good at passive multiplexing or demultiplexing. However Silicon photonics is very good in high speed detection and modulation. Hence in the hybrid approach of FIG. 1, the PLC chip 112 is used to couple lasers and fibers, polarization diversity and multiplexing and demultiplexing, while the SiPh chip is used to modulate and detect. It is also sometimes easier to integrate high speed electronics directly in the Silicon photonics chip which is another benefit for this hybrid PLC-SiPh approach.

The hybrid approach works best when the coupling of light between the two chips is highly efficient. Typically hybrid approaches use either edge coupling or grating coupling for this purpose. However, both of these techniques suffer from significant limitations. Aspects of the present invention provide ways to significantly improve the efficiency of both such coupling techniques.

Figure 2A:
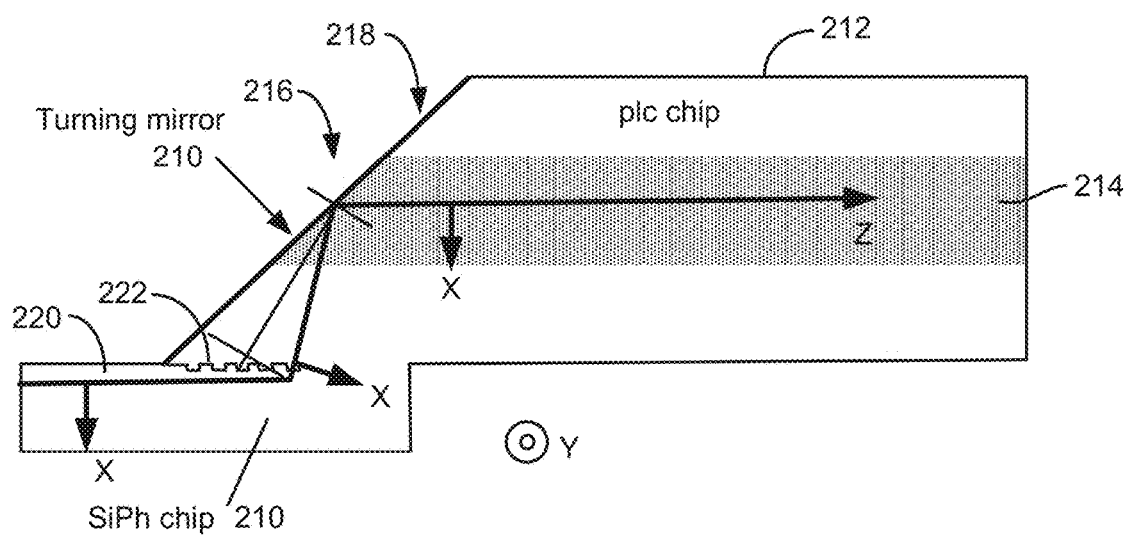
FIGS. 2A and 2B are schematic diagrams illustrating coupling of SiPh and PLC chips using an improved grating coupling technique.
Figure 2B:
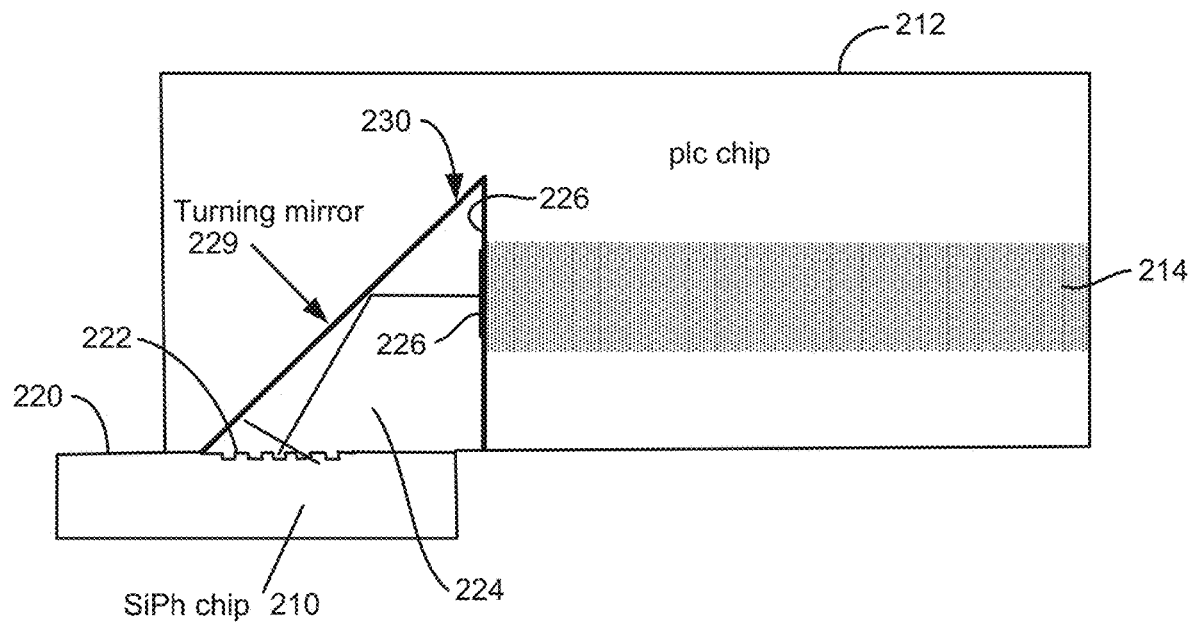

FIGS. 2A and 2B are schematic diagrams illustrating coupling of SiPh and PLC chips using an improved grating coupling technique. The grating coupling technique utilizes a grating coupler on the SiPh chip designed for a focusing distance which is substantially the same as the distance from the SiPh chip to PLC waveguide. This makes the focusing plane and the PLC waveguide at substantially the same level, which maximizes the coupling efficiency.

In particular, referring to FIG. 2A, a SiPh chip 210 is attached to a PLC chip 212, for example by using an index matching glue. The two chips are oriented in parallel planes (their respective major surfaces are substantially parallel to each other), as opposed to being oriented perpendicularly to each other. The PLC chip 212 has a PLC waveguide 214 which terminates at an end facet 216. In the embodiment of FIG. 2A, the end facet 216 coincides with an angled edge facet 218 of the PLC chip 212 itself, which is polished to form a so-called "turning mirror" 219 to reflect light emitted from the PLC waveguide 214, onto the SiPh chip 210 as hereinafter described. (In another embodiment, not shown, the PLC waveguide 214 terminates short of the end facet 218 and turning mirror 219.) The SiPh chip 210 has a SiPh waveguide 220 which contains a Bragg grating 222. The Bragg grating is designed so as to diffract light from the SiPh waveguide 220 out of the plane of the SiPh chip 210 and toward the PLC chip 212. Unlike prior coupling arrangements, the Bragg grating 222 is designed such that light emitted from the Bragg grating 222 into the end facet 216 of the PLC waveguide 214, after reflecting off the turning mirror 219, focuses at the end facet of the PLC waveguide.

The above description (and other descriptions herein) assume Helmholtz reciprocity, which is the principle that a ray of light and its reverse ray encounter matched optical adventures, such as reflections, refractions, and absorptions in a passive medium, or at an interface. Thus the description of the turning mirror 219 as being oriented to reflect light emitted from the PLC waveguide 214, onto the SiPh chip 210, also defines how light behaves when light is traveling in the opposite direction. It does not imply that the mirror works only in one direction. Similarly, the description above of the Bragg grating being designed so as to focus light from the SiPh waveguide 220 into the end facet 216 of PLC waveguide 214, also defines how light behaves when light is traveling from the PLC waveguide 214 into the SiPh waveguide 220 by way of the Bragg grating. It does not imply that the Bragg grating works only in one direction. Also, note that as used herein, no distinction is intended between substances of an optical structure which are disposed in the chip substrate, or disposed in an overlying layer, or partially within an partially above the top surface of the chip. For example, all of the features of a waveguide, including core material, cladding material, Bragg grating structures, and so on, are all described equivalently herein as being either "on" the substrate or "in" the substrate, and no distinction is intended between the two words. Still further, as used herein the term "light" refers to any optical energy. It is not limited to visible light.

Designing the Bragg grating and the turning mirror such that light from the Bragg grating focuses at the end facet of the PLC waveguide 214 helps to maximize the coupling of light from one of the waveguides to the other. In addition, the PLC waveguide optical axis, at the end facet 216, is parallel to the optical axis of the SiPh waveguide 220 within the Bragg grating 222, such that from a top view, the two optical axes are aligned with each other within 1°. This helps to ensure that light emitted from either waveguide reaches the other waveguide within an optimum acceptance angle.

Note that in FIGS. 2A and 2B the parallel planes of the two chips 210 and 212 are offset from each other vertically. The planes of the two chips need not necessarily be exactly parallel to each other, however, assuming accommodations are made in the turning mirror and/or the Bragg grating.

In another embodiment, as shown in FIG. 2B, a recess 224 is formed (etched, typically) into the surface of the PLC chip 212. The recess opens toward the SiPh chip 210 and has a first sidewall 228 coinciding with the end facet 226 of the PLC waveguide 214, and a second sidewall 230 disposed across the recess 224 from the PLC waveguide end facet 226. The second sidewall is reflective, and is angled to form the turning mirror 229.

The distance at which the Bragg grating 224 is designed to focus, is the sum of the distances from the Bragg grating to the turning mirror and from the turning mirror to the PLC waveguide 214 end facet. In the embodiment of FIG. 2A in which the end facet of the PLC waveguide coincides with the end facet of the PLC chip, the second of these two distances is zero. The distances are optical distances rather than physical distances, meaning the physical distances can vary depending on the indices of refraction through which the light has to travel. In one embodiment, the recess 224 in the embodiment of FIG. 2B is filled with air. In another embodiment it is filled with another material. The index of refraction of the fill material is taken into account in determining the focusing distance of the Bragg grating.

Also, the focusing distance need not be exactly at the end facet of the PLC waveguide 214. It can be short or long by up to one Rayleigh distance without significantly impacting coupling efficiency.

Figure 3A:
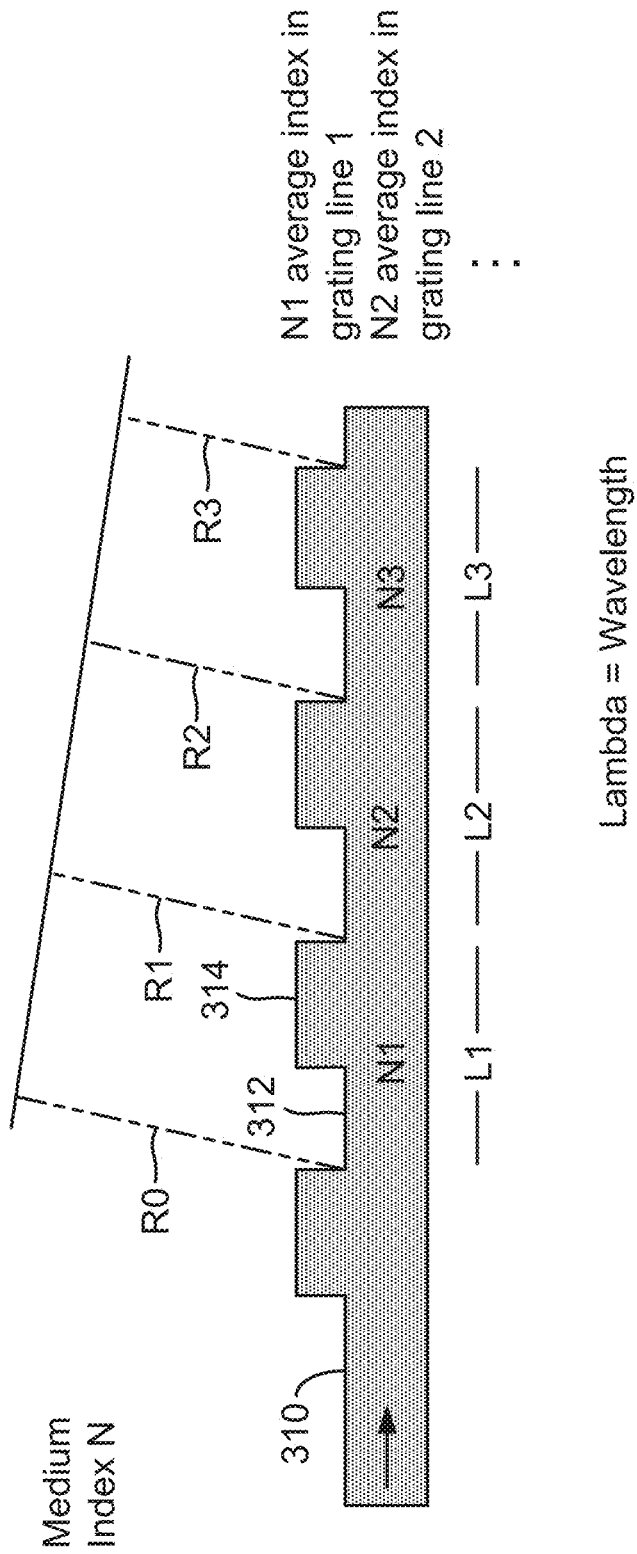
FIG. 3A is a schematic drawing of a portion of a conventional Bragg grating in side elevation view.

FIG. 3A is a schematic drawing of a portion of a Bragg grating in side elevation view. The grating of FIG. 3A is conventional, in that the plane-phase front is created directly at the grating surface and the focusing distance is infinite. It can be used, for example, to couple light into a vertically oriented optical fiber whose end facet is glued directly onto the top of the grating. In FIG. 3A, the waveguide core material 310 is shaded and light travels left-to-right. Four grating "lines" or "teeth" are shown, each with a trench 312 followed by a raised segment 314, all made of the same core material. Each tooth has an effective index of refraction N1, N2, . . . which is a function of the duty cycle of the tooth (ratio of raised segment to sum of raised and trenches). In FIG. 3A, all of the teeth have the same period and duty cycle, so they all refract light by the same angle. The resulting rays from all of the grating teeth are parallel to each other as shown in the drawing. They never form a constructive interference pattern at any distance, and therefore never focus.

Figure 3B:
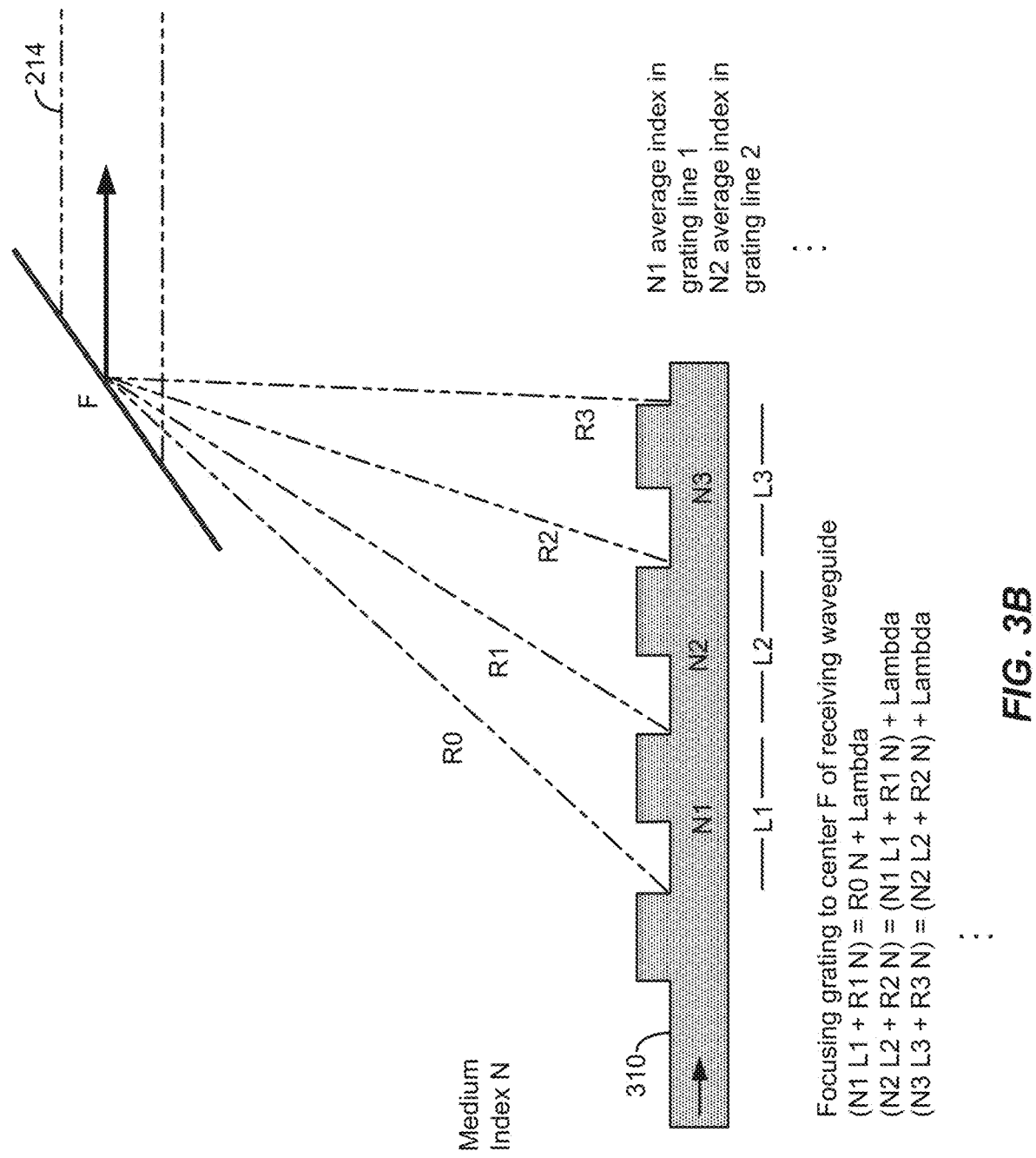
FIG. 3B is a schematic drawing of a portion of a Bragg grating in side elevation view, which can be used to implement aspects of the invention.

FIG. 3B is a schematic drawing of a portion of another Bragg grating in side elevation view, which can be used to implement aspects of the invention. The structure of the grating in FIG. 3B is the same as that of FIG. 3A, except that the "effective optical period" of the teeth decreases monotonically as light travels longitudinally through the grating. The refraction angles of the main diffraction lobe from successive teeth therefore gradually increase, such that they all constructively interfere at the desired point F at the end facet of the PLC waveguide 214. As used herein, the "effective optical period" is the physical longitudinal period of the tooth multiplied by the average speed of light in the tooth, which in turns depends on the average index of refraction in the tooth. Thus the effective optical period can be varied either by varying the physical period (making successive teeth shorter in the longitudinal dimension), or by varying the duty cycle (decreasing the duty cycle of successive teeth), or by a combination of both techniques. Other techniques for varying the effective optical period will be apparent to the reader, such as doping the teeth with a varying amount of index-changing dopant).

Figure 3C:
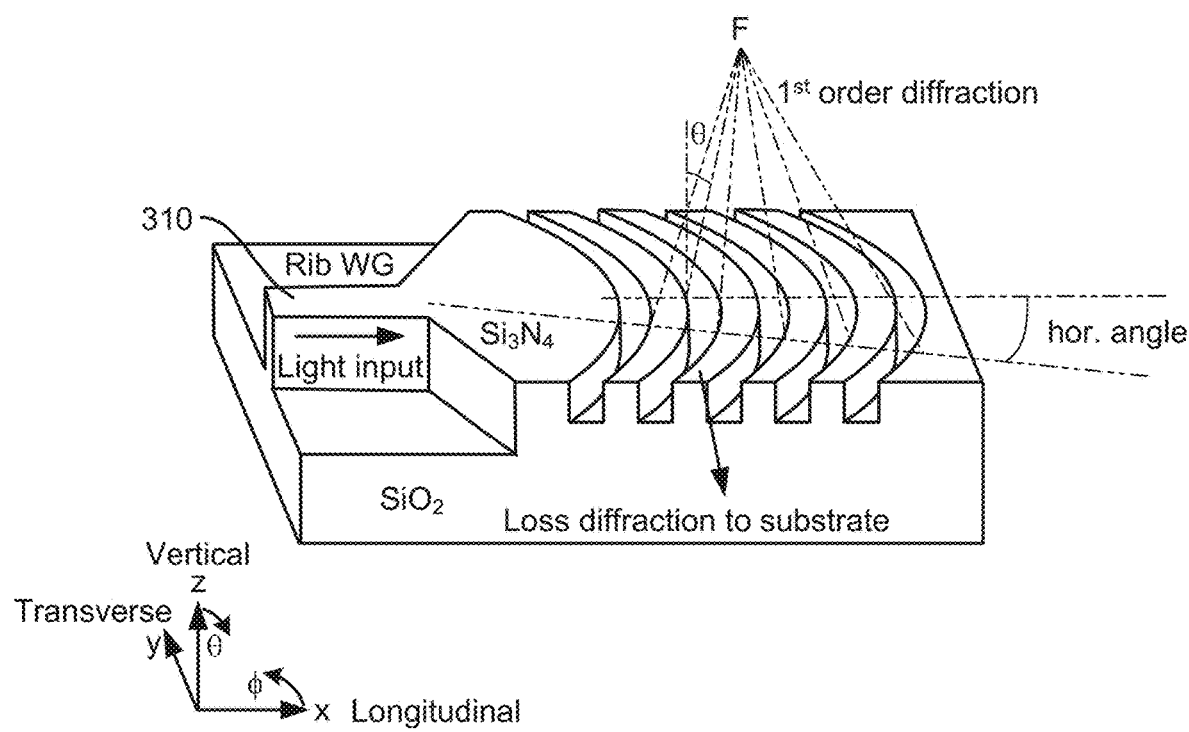
FIG. 3C is a perspective view of the grating of FIG. 3B.

FIG. 3C is a perspective view of the grating of FIG. 3B. FIG. 3C also defines the longitudinal (X), transverse (Y) and vertical (Z) dimensions as used herein with respect to a grating. Light spreads transversely at the entrance to the grating section, and the grating lines are designed in such a way that all possible optical paths between the in-plane waveguide 310 (source) and out-of-plane focal point F (image) differ by one wavelength from one grating line to the next one. This includes rays that encounter the tooth at any horizontal angle, hence the substantially concentric arcuate shape of the grating lines. In this way, constructive interference is obtained at the focal point.

Figure 3D:
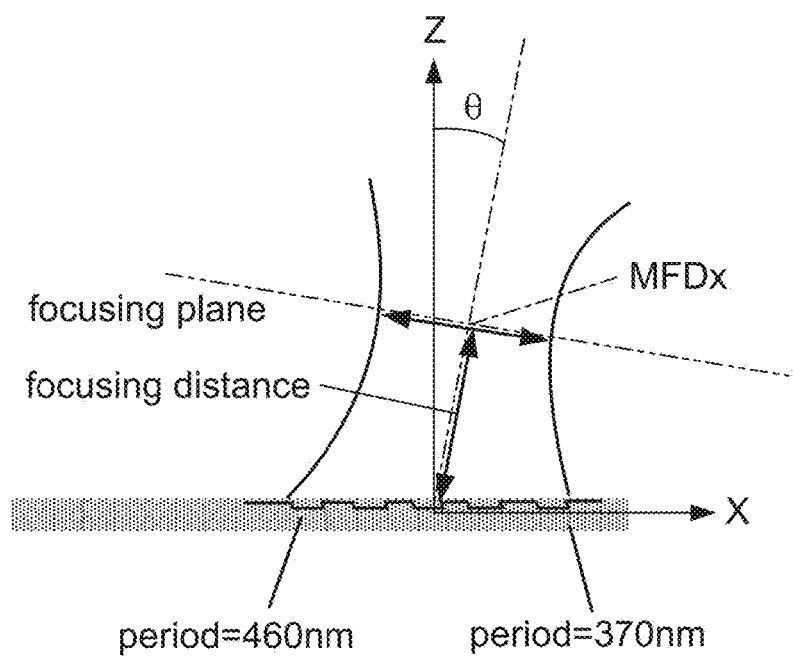
FIG. 3D is a schematic diagram illustrating correlation of the focusing plane and focusing distance of a grating coupler with approximately varying periods in the SiPh chip for single mode light.

FIG. 3D is a schematic diagram illustrating the correlation of the focusing plane and focusing distance of a grating coupler with approximately varying periods in the SiPh chip for single mode light. The grating coupler is situated at a certain distance in free space, whether air or index matching glue or any other medium, before the light hits the turning mirror and then again some propagation in free space before the light enters the PLC waveguide. So, for the turning mirror configuration it is desirable to focus the light distribution over a certain distance, to make it in focus exactly where the PLC starts. It is designed to make the focusing plane of the grating coupler coincide with the end-facet of the waveguide in the PLC chip so as to maximize the coupling of light.

Note that unlike many conventional coupling methods, a Bragg grating such as that shown in FIGS. 3B and 3C can be designed to couple light having multiple (two or more) transverse optical modes from a SiPh waveguide to a PLC waveguide and vice-versa. That is, the coupling mechanisms described herein work whether the SiPh waveguide 220 and the PLC waveguide 214 support multiple transverse modes, as well as only a single mode.

Figure 4A:
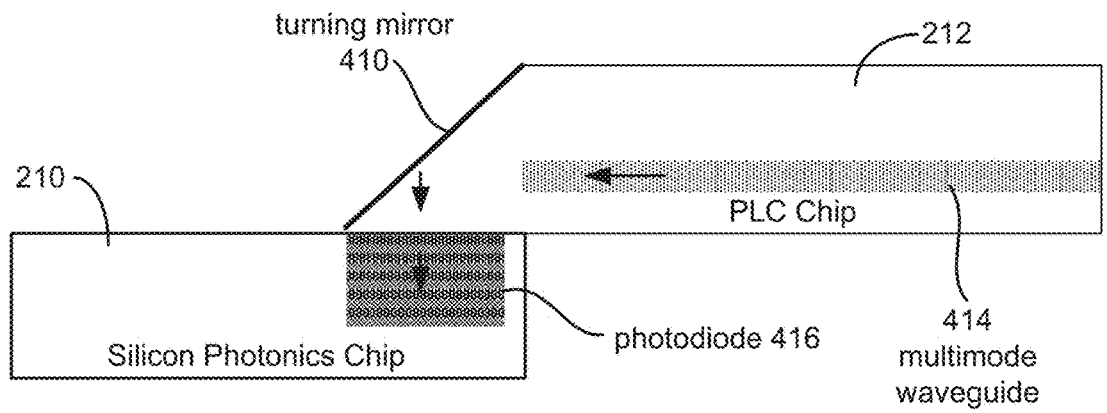
FIG. 4A is a side elevation view of a schematic diagram illustrating the detection of the light coupling between the SiPh and PLC chips.
Figure 4B:
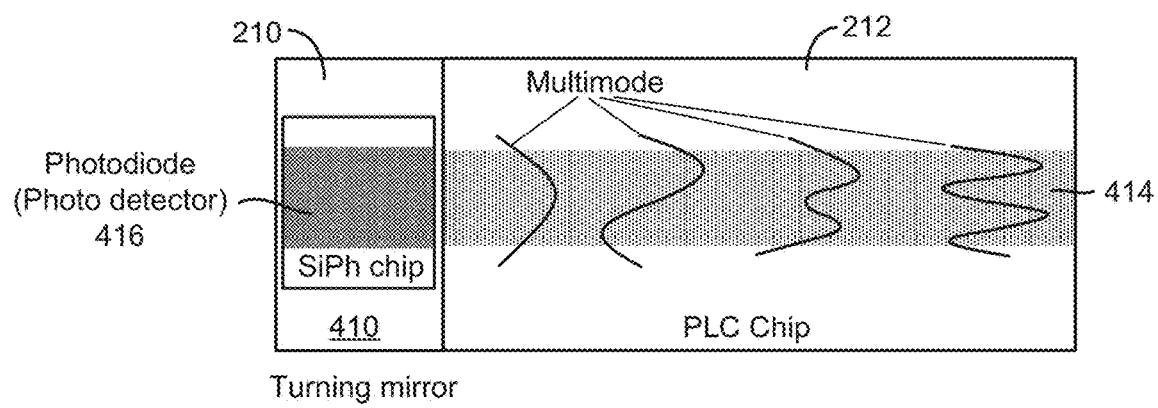
FIG. 4B is a plan view of the schematic diagram of FIG. 4A.

The ability to couple multiple modes can be a significant advantage, especially when coupling into a photodetector. FIG. 4A is a side elevation view of a schematic diagram illustrating the detection of the light coupling between the SiPh and PLC chips. The device includes a PLC chip 212 and a SiPh chip 210, both as shown in FIGS. 4A and 4B. The PLC chip 212 has a PLC waveguide 414, which emits light toward a turning mirror 410. The turning mirror can be of any structure, including the two variants illustrated in FIGS. 4A and 4B. The SiPh chip 210 contains a photodiode photo detector 416 positioned to receive the light reflected off the turning mirror 410. The light propagating through the PLC waveguide 414 is reflected, at the turning mirror, to the photo detector 416 on the surface of the SiPh chip 210. The photo detector can be a photodiode, such as a Ge-photodiode. The light entering the photo detector will be detected and the data reconverted into electronic form. The photo detector can detect the sum-power from all modes propagating in the PLC waveguide 414, so the device will work even if the PLC waveguide 414 is a multimode waveguide. The turning mirror directs the light from the multimode waveguide 414 to the photo detector, top-entry detector, of the SiPh chip. FIG. 4B is a plan view of the schematic diagram of FIG. 4A, illustrating the detection of multimode light coupling between the SiPh and PLC chips.

Figure 5A:
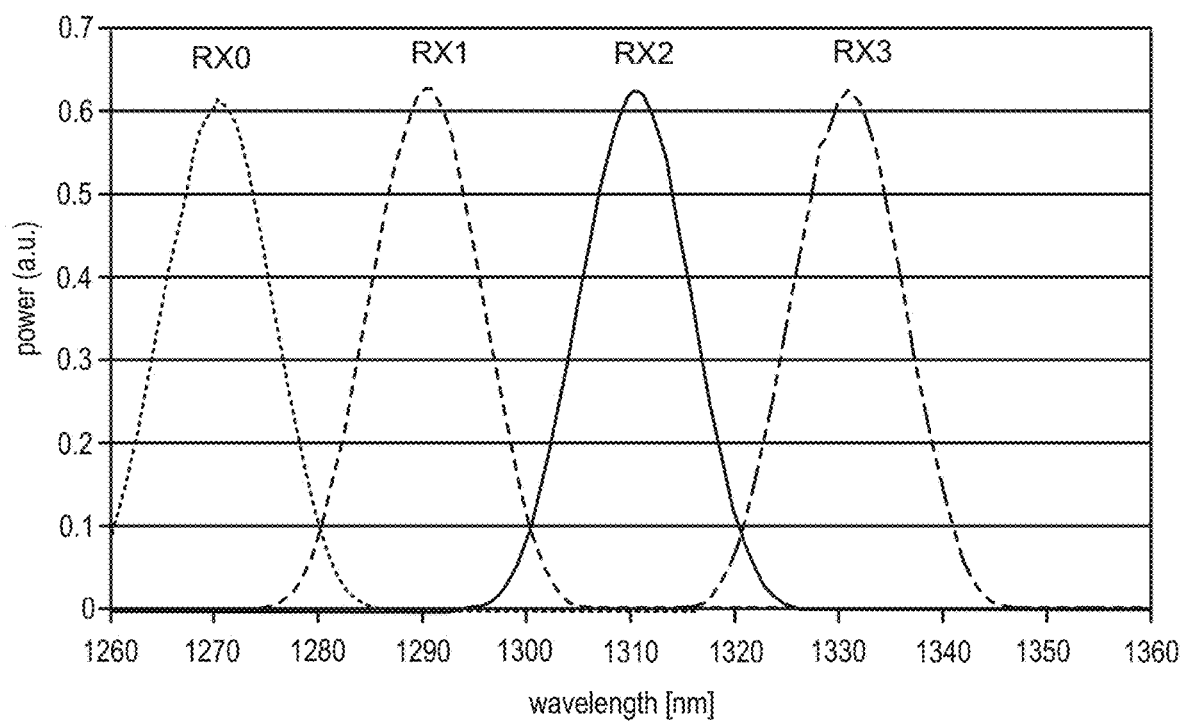
FIG. 5A is a plot illustrating the intensity of four single mode wavelength channels as output by the receive demultiplexer in FIG. 1.
Figure 5B:
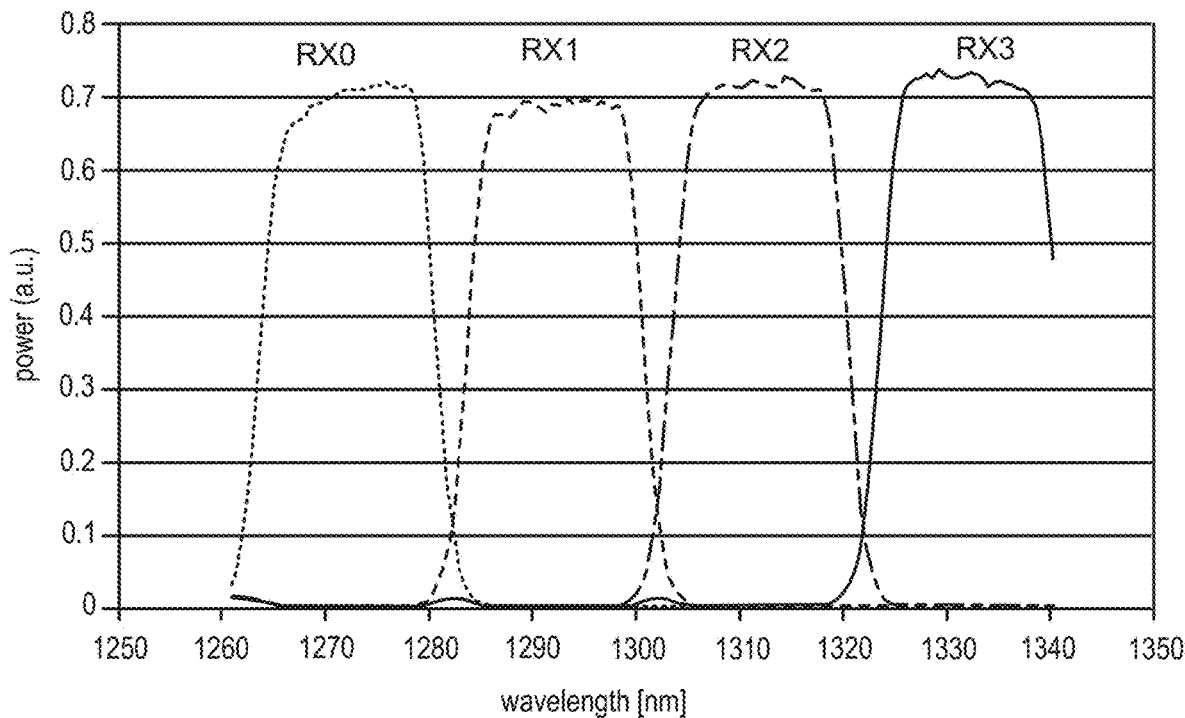
FIG. 5B is a plot illustrating the intensity of four multi-mode wavelength channels as output by the receive demultiplexer in FIG. 1.

Advantages of coupling multimode light to a photo detector can be seen by comparing FIG. 5A to FIG. 5B. FIG. 5A is a plot illustrating the intensity of the four wavelength channels as output by the demultiplexer 116 in the transceiver of FIG. 1. The fiber 120 is conventional single mode fiber, and the receive demultiplexer 116 is a conventional AWG with single mode output waveguides 134. It can be seen that the plot shows that the passbands have their highest intensity at about 0.6 a.u. and have narrow distribution. FIG. 5B is a plot illustrating the intensity of the four wavelength channels where the fiber supports multiple modes, and the receive demultiplexer 116 is an AWG with multimode output waveguides. Compared to the single mode, the passband of the multimode AWG has highest intensity at about 0.7 a.u. and has wider distribution. This means the passband of the multimode AWG has higher optical intensity and lower optical loss for a wider range of frequencies. In addition, since the photo detector 416 detects the sum-power from all modes that it receives, significantly greater optical signal power can be provided to the photo detector 416 for detection, thereby enabling better detection of weak signals and faster detection of all signals. Thus in some applications these higher order modes are very important to optimize the performance of a receiver.

Figure 6:
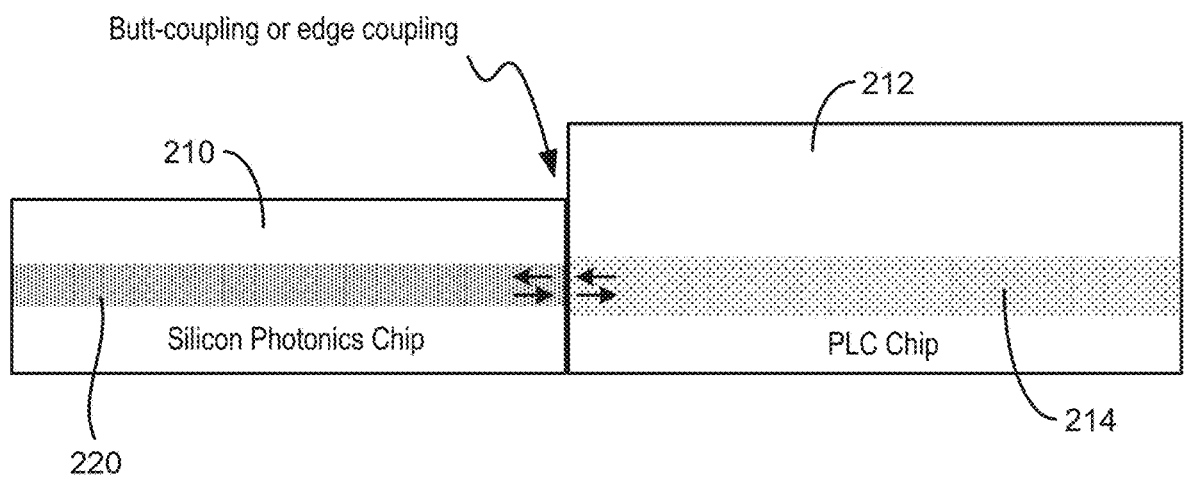
FIG. 6 is a schematic diagram illustrating coupling of the SiPh chip 210 to the PLC chip 212 using the edge coupling technique.

FIG. 6 is a schematic diagram illustrating coupling of the SiPh chip 210 to the PLC chip 212 using the edge coupling technique, also known as the butt-coupling method. The SiPh waveguide 220 is aligned with the PLC waveguide 214 so that the light can transmit from the PLC waveguide to the SiPh waveguide or vice-versa. Importantly, in the embodiment of FIG. 6, both the SiPh waveguide 220 is aligned with the PLC waveguide 214 are multimode waveguides in that they support two or more modes in the transverse dimension. As used herein, a "coupler" is any structure that couples light from one waveguide into the other. In the embodiment of FIG. 6, for example, the coupler comprises an index matching glue for the butt-coupled waveguides. In the FIG. 2A embodiment, as another example, the coupler includes both the turning mirror and the Bragg grating.

In conventional Silicon photonics, the optical beam that is supported by a conventional grating coupler matches the mode of a single mode fiber. However coupling to a PLC may require other mode shapes to be transferred to the Silicon photonics chip. Preferably one type of mode that should be supported is a fundamental Gaussian like mode that is no longer point symmetric. In PLC chips the vertical confinement, or out-of-substrate-plane confinement, cannot be made arbitrarily large in comparison to the horizontal mode field, or in-substrate-plane confinement. Due to the near 90 degree reflection at the end-facet, the out-of-substrate-plane field from the PLC waveguide is converted to an in-substrate field distribution on the grating coupler. Hence the longitudinal field along the X-axis in the grating coupler is to be matched to the out-of-substrate plane or X-field in the PLC waveguide. This is the reason why FIG. 3C has a different axis definition compared to FIG. 7A.

Figure 7A:
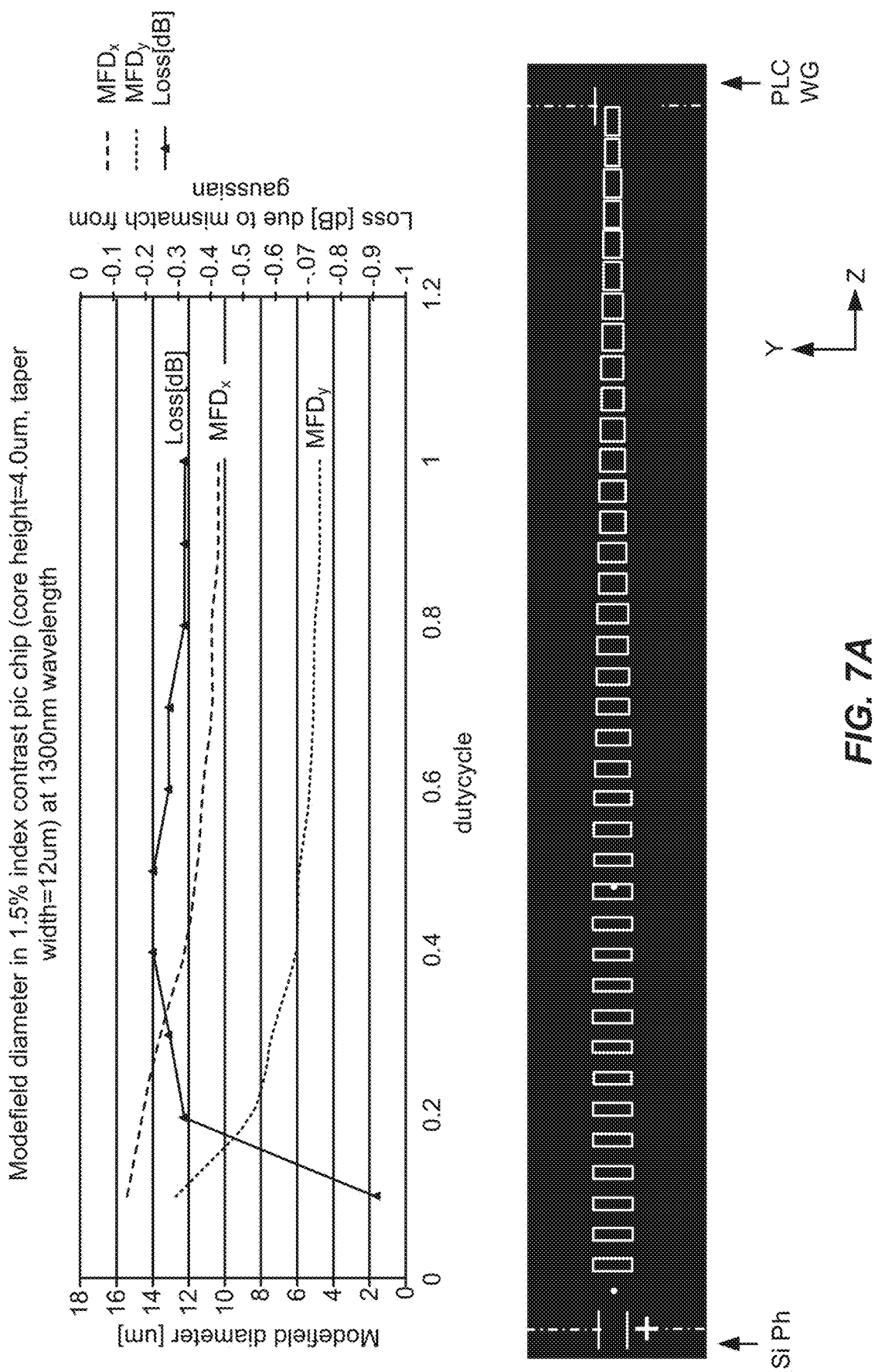
FIG. 7A illustrates a top view of a mode field shape converter configured to convert light having the mode field shape of one of the waveguides to the mode field shape of the other waveguide, and a plot showing the mode field diameter variation.
Figure 7B:
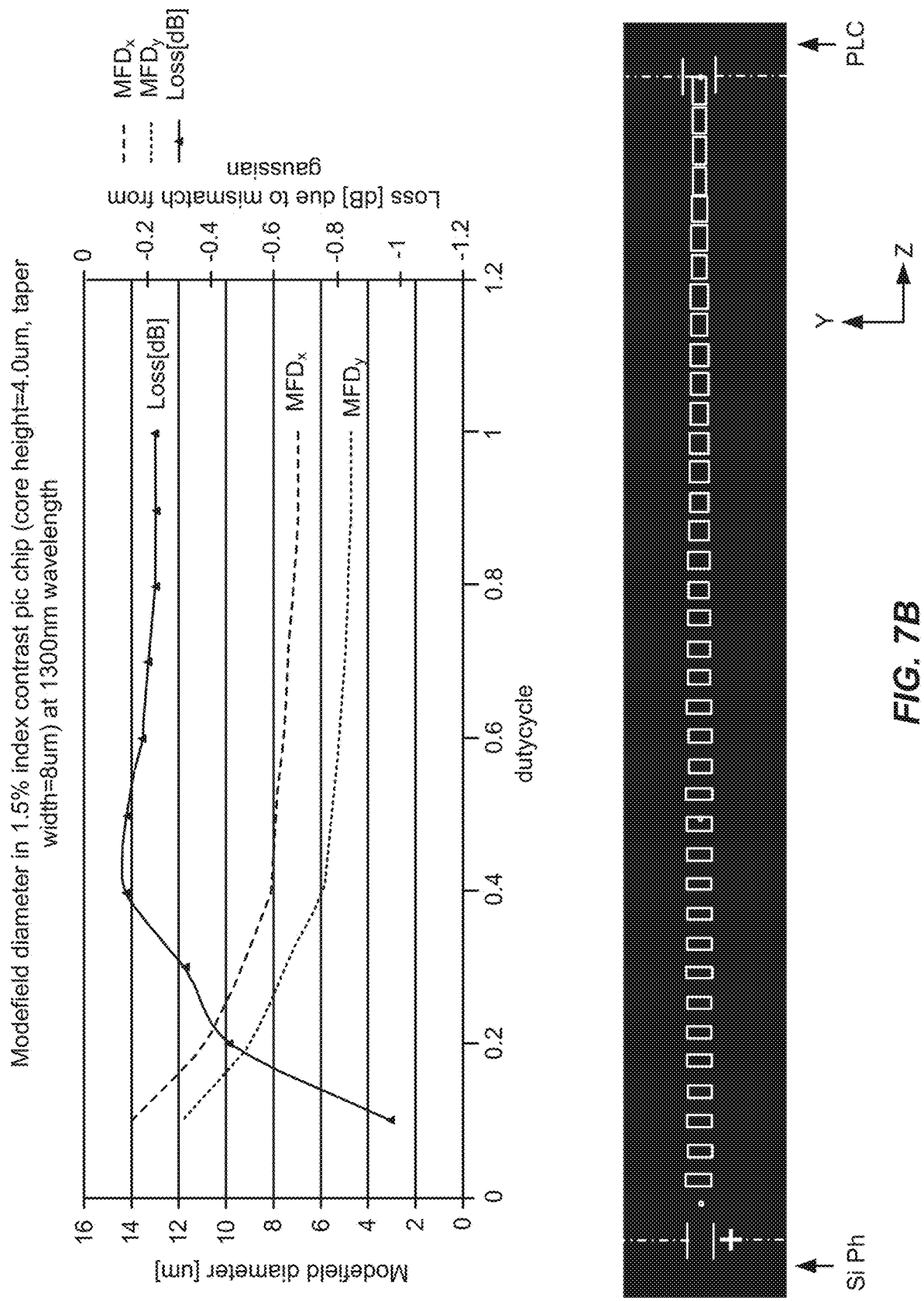
FIG. 7B illustrates a top view of a mode field shape converter similar to that of FIG. 7A, except that the taper width is 8 µm instead of 12 µm; and a plot showing the mode field diameter variation.

There is a huge benefit in designing grating couplers that have elliptical beam profile. Such a beam profile is wider in the horizontal plane (transverse or Y-dimension) and narrower in the longitudinal grating X-dimension. This matches a PLC waveguide mode that is wider in the horizontal transverse Y-dimension and narrower in the vertical PLC X-dimension for maximum coupling. In FIGS. 7A and 7B, it is shown how Gaussian like mode fields can be created in PLC chips for a given technology using segmented waveguides that are arbitrarily wide in the Y-dimension but are slightly restricted in width in the X-dimension. The technique of FIGS. 7A and 7B can be used for coupling an elliptical mode in a PLC waveguide to an elliptical mode in a SiPh waveguide, and grating coupler, using any of the coupling methods described herein.

FIG. 7A (lower diagram) illustrates a top view of a mode field shape converter configured to convert light having the mode field shape of one of the waveguides to the mode field shape of the other waveguide. The structure is formed in a terminal portion of the PLC waveguide: the PLC waveguide enters from the right in the diagram, and the SiPh waveguide enters from the left. Depending on the coupling mechanism, the SiPh waveguide may be butt-coupled to the left end of the segmented region, or it may be separated from the segmented region by a turning mirror and/or a Bragg grating in the SiPh chip, or by any other coupling mechanism. Each of the rectangles in FIG. 7A represents the shape (in top view) of a core region of the PLC waveguide, and the spaces longitudinally between the core segments are cladding material. The depth of the segments in the vertical dimension is constant, and is the same as the depth of the remainder of the core of the PLC waveguide to the right of the segmented region. It can be seen that the segments begin (on the right end of the diagram) with a transverse width (in the Y dimension) substantially equal to that of the preceding PLC waveguide core, and gradually widen monotonically toward the SiPh end of the segmented region. At the same time, the segments also narrow in the longitudinal (Z) dimension monotonically from right to left. The longitudinal spacing between the segments also increases monotonically from right to left. In particular, the embodiment of FIG. 7A implements a taper width of 12 μm.

FIG. 7A (upper diagram) shows that the mode field diameter (MFD) in a PLC chip can be varied by using a segmented waveguide. For a duty cycle of 0.4 and taper width of 12 μm, the loss is only 0.2 dB compared to a Gaussian like mode, and the mode field diameter in the Y-dimension is 12 μm ($MFD_y$=12 μm), and in the X-dimension is 6 μm ($MFD_x$=6 μm).

FIG. 7B (lower diagram) illustrates a mode field shape converter similar to that of FIG. 7A, except that the taper width is 8 μm instead of 12 μm. As shown in FIG. 7B (upper diagram), for a duty cycle of 0.4 and taper width of 8 μm', the loss is only 0.2 dB compared to a Gaussian like mode, and $MFD_y$=8 μm, $MFD_x$=6 μm.

Thus a mode field shape converter has been disclosed which allows the PLC waveguide and field from the mode field shape convertor to be designed for optimal coupling (e.g. elliptical), and the SiPh waveguide and/or grating coupler also to be designed to match the mode field from the PLC. Any of the couplers described herein can still be used by implementing a mode field shape converter in between the two waveguides. Other methods and techniques for performing the mode field conversion will be apparent to the reader.

Figure 8:
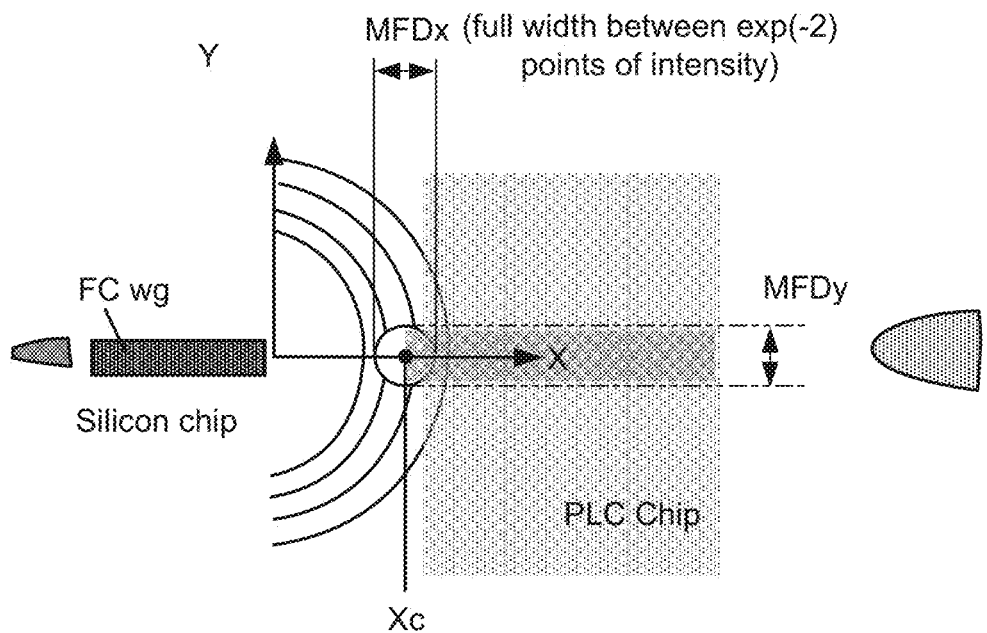
FIG. 8 schematically illustrates a symmetrical beam profile in a single mode.

For other applications it is desirable that the grating coupler and its connecting waveguide not only support a (highly) asymmetrical fundamental mode, but higher order modes as well. FIG. 8 schematically illustrates a symmetrical beam profile in a single mode. After the optical beam propagates through the waveguide of the PLC chip, the beam provides a fundamental Gaussian distribution and a symmetric, circular beam shape. The extent of the mode field diameter (MFD) in the horizontal plane (transverse, Y-dimension, in-plane MFD) is substantially the same as that in the dimension perpendicular to the substrate plane (X-dimension, out-of-plane MFD), i.e. $MFD_x$=$MFD_y$. In order to get maximum coupling the grating coupler in SiPh is designed to also create a field with circular beam shape. I.e. the extent of the mode in the horizontal plane (transverse, Y-dimension, in-plane MFD) being equal to the longitudinal X-plane in the grating coupler. In this example, the grating coupler of the SiPh chip and the waveguide of the PLC chip support the single mode only.

Figure 9:
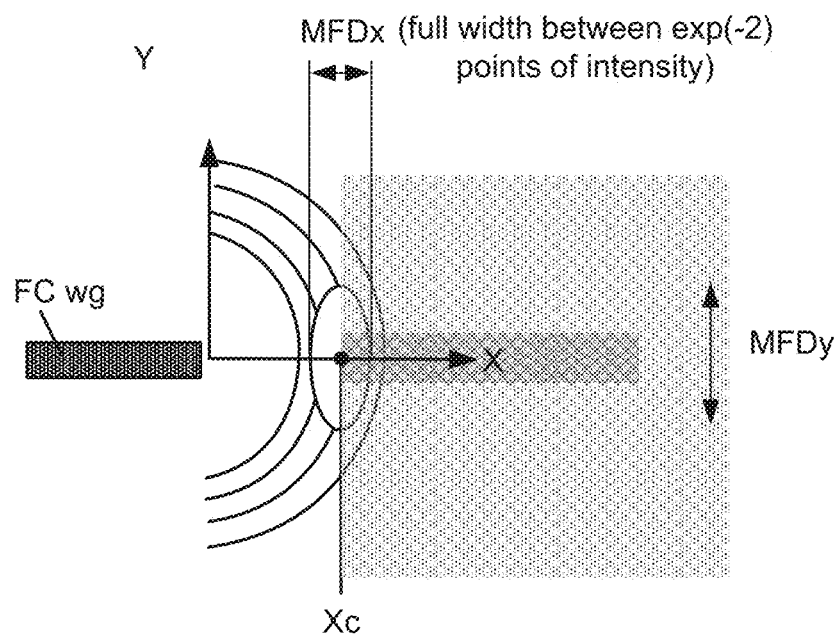
FIG. 9 schematically illustrates an elliptical beam profile according to one embodiment.

FIG. 9 schematically illustrates an elliptical beam profile according to one embodiment. In the PLC chip, where the vertical confinement cannot be made arbitrarily large in comparison to the horizontal plane, the waveguide of PLC chip can be optimized to have an elliptical beam profile which is wider in the horizontal plane (Y axis) and narrower in the dimension perpendicular to the substrate plane (X axis), i.e. $MFD_y$>$MFD_x$. As such, the grating coupler of the SiPh chip can be designed to match the elliptical beam profile, by making the longitudinal field wider than the horizontal field in the grating coupler. In the SiPh chip, the grating coupler can support the optical beam matching the mode of a single mode fiber. In addition, the coupling to the PLC chip will dictate other shaped mode to be transferred to the SiPh chip. In this example, one type of mode is a fundamental Gaussian like mode that is no longer point symmetric. As a result, the resulting CWDM transceiver can accommodate not only one single mode which is more or less symmetrical, but other shaped single modes which may be elliptical.

The spot size and shape can be adjusted by the various combinations of the SiPh and PLC chips so that the grating coupler along the optical axis has a mode size that matches the vertical mode in the PLC technology of interest, e.g. Mode Field Diameter (MFD) of 5-9 um. The grating coupler may have much wider dimension in the in-substrate dimension, e.g. MFD of 10-20 um. The wider mode field diameter provides the SiPh chip with the benefit of better tolerance of misalignment.

Figure 10:
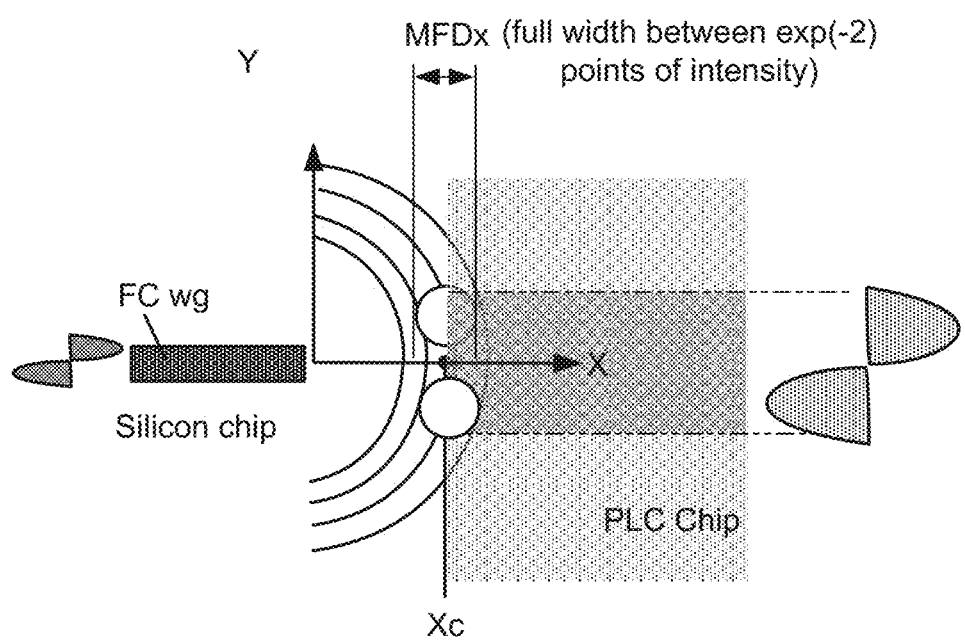
FIG. 10 schematically illustrates the beam profile of a higher order mode in accordance with another embodiment.

FIG. 10 schematically illustrates the beam profile of a first order mode in accordance with another embodiment. With an optimization of the grating coupler of SiPh chip and the waveguide of the PLC chip as described herein, the combination of the SiPh and PLC chips can support not only a highly asymmetrical fundamental mode, but also higher other modes. This is particularly important in the in-substrate dimensions for the SiPh and PLC chips. This allows efficient coupling of higher order modes from the PLC chip to the SiPh chip. As mentioned, in some applications these higher order modes are very important to optimize the performance of the receiver.

The techniques we describe in this application are related to hybrid Silicon-PLC products where optical coupling between Silicon photonics chips and PLC chips are further optimized.

This is achieved by one or more of the following, among other things:

1) Modifying the grating coupler in the silicon photonics chip such that it supports elliptical modes.
2) Modifying the grating coupler in the Silicon photonics chip such that it supports and connects to a multimode waveguide (multimode in the in-substrate, transverse dimension) of the Silicon photonics chip and/or to a multimode waveguide in the PLC chip.
3) Modifying the detector such that it detects the sum-power from all modes propagating in the multimode Silicon waveguide.
4) Modifying the spot size convertor in the PLC and grating coupler in silicon photonics such that it has optimum coupling. This means that the grating coupler along the optical axis has a mode size that matches the vertical mode in the PLC technology of interest, e.g. Mode Field Diameter (MFD) of 5-9 um. The grating coupler may have much wider dimension in the in-substrate dimension, e.g. MFD of 10-20 um. The wider mode field diameter has the benefit of better tolerance for alignment and can be easily designed by a conventional taper in both PLC and Silicon photonics technology.
5) Optimizing the focusing plane in the design of the Silicon grating coupler such that it coincides with the distance between the end-facet of the PLC-waveguide from the grating coupler.
6) Modifying the spot size convertor in the PLC chip using a combination of segmentation and tapering so that the PLC field is optimally matched in both X- and Y-dimensions to the field originating from the silicon photonics end facet at the focusing plane, whether grating coupler or edge coupler.

The solutions described herein allow an embodiment in which several lateral modes propagate in the Silicon waveguide by making it wider than conventional single mode waveguides to support multiple modes, two or more. All modes will be entering the Germanium (Ge) photodiode on the Silicon photonics chip. The solutions described herein allow the use of an arrayed waveguide grating (AWG) with multimode receiver waveguides that widen the passband of the demultiplexer Receiver Optical Sub-Assembly (ROSA), which results in greater tolerance to misalignment to the laser.

Figure 11:
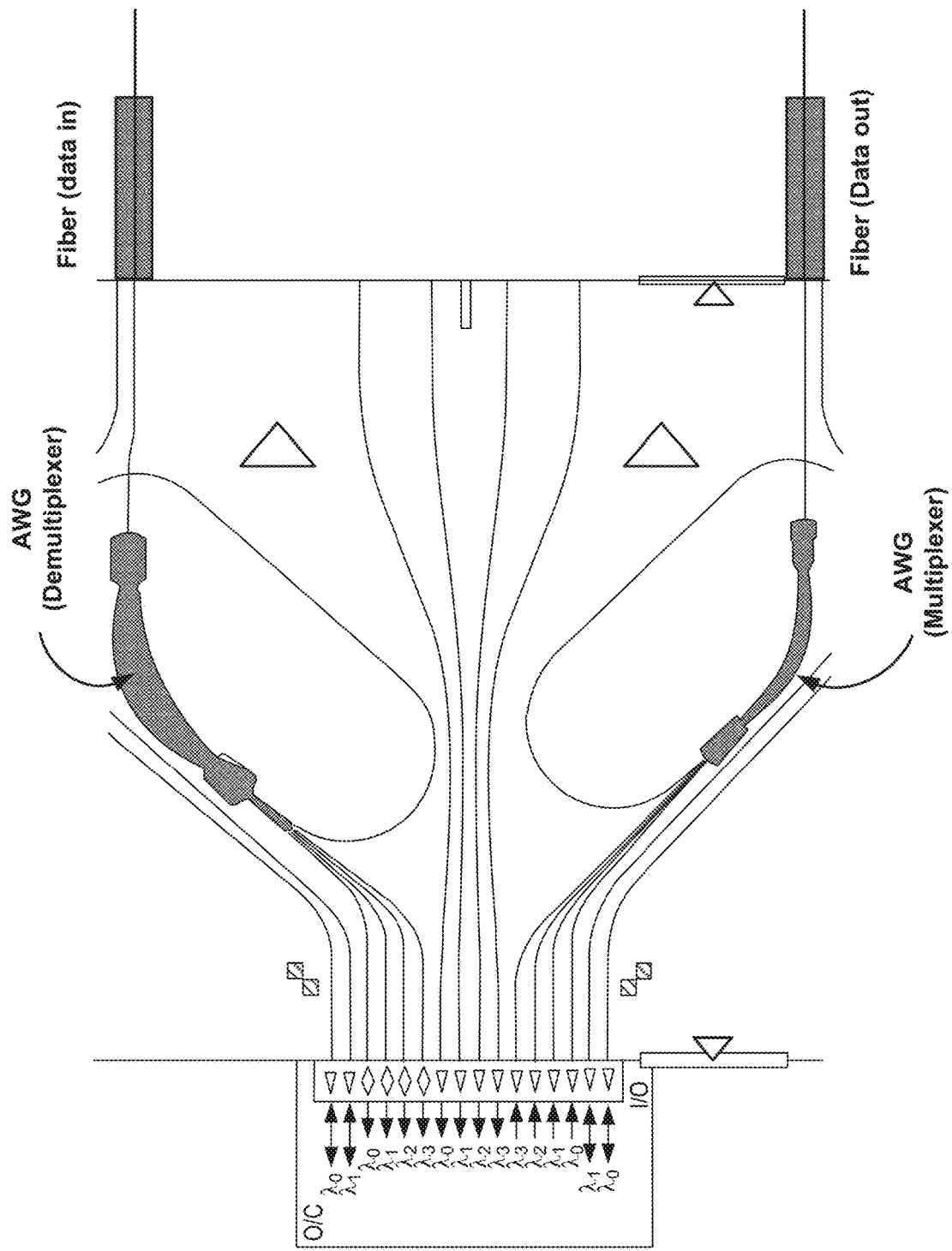
FIG. 11 is a top view of a layout illustrating the arrangement of optical components of the PLC chip to implement the arrangement of FIG. 1.
Figure 12:
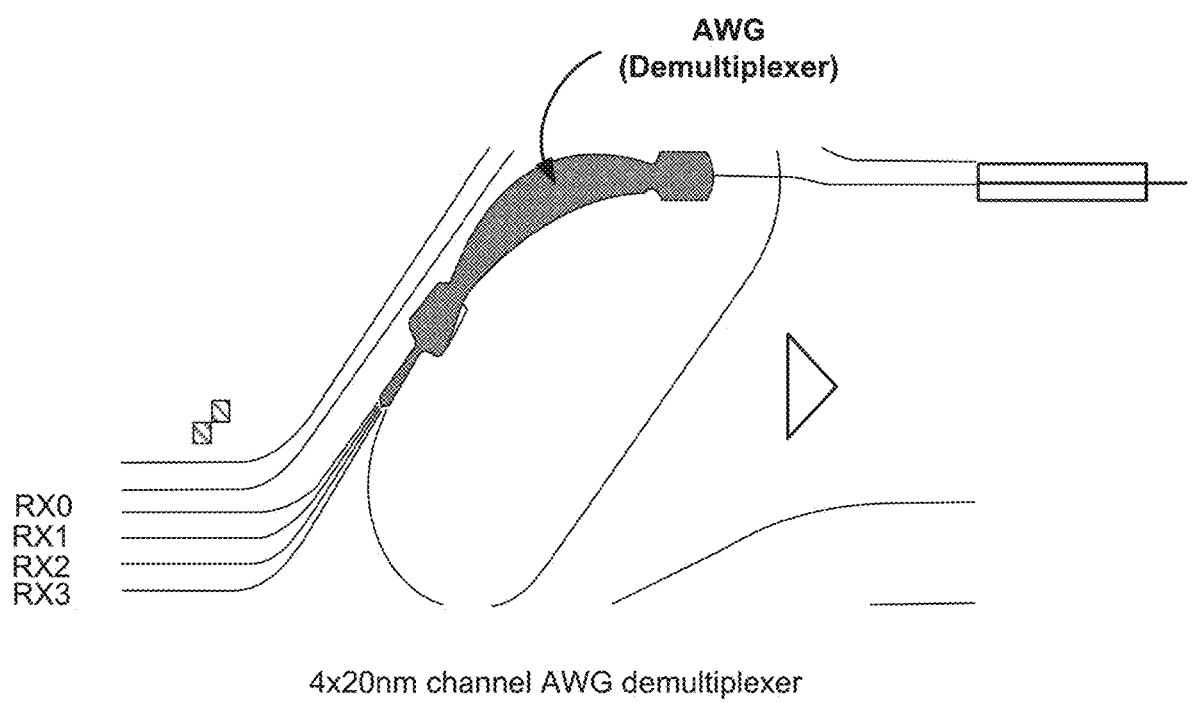
FIG. 12 is an enlarged image of the multimode receiver and 4×20 nm channel AWG demultiplexer shown in FIG. 11.

FIG. 11 is a top view of a layout illustrating the arrangement of optical components of the PLC chip to implement the arrangement of FIG. 1. The PLC chip has two arrayed waveguide gratings (AWGs). One acts as a multiplexer and the other acts as a demultiplexer. Polarization diversity may also be implemented on the PLC chip. FIG. 12 is an enlarged image of the multimode receiver and 4×20 nm channel AWG demultiplexer shown in FIG. 11. As mentioned, great benefits can result if the AWG demultiplexer can be designed to support multimode light, and this is made possible by aspects of the invention as described herein.

With the use of the asymmetrical beam profile and the wider mode field diameter (e.g. MFDy in FIG. 9), the present technology allows, in addition to the single mode, other modes to propagate into the SiPh waveguide and from the PLC chip. So signals from all modes will enter a photo detector, such as a Ge photodiode, on the SiPh chip.

The use of the AWG with the multimode receiver can widen the passband of the demultiplexer Receiver Optical Sub-Assembly (ROSA), resulting in more tolerance of the misalignment to the fiber.

The mode described herein refers to waves of optical energy distribution that propagate without loss and without change in energy distribution along the waveguide direction.

In various embodiments, the SiPh chip can be made using existing semiconductor fabrication techniques, and the techniques herein facilitate creating hybrid devices in which the optical and electronic components are integrated onto a single microchip.

In various embodiments, the SiPh chip can accommodate elliptical modes when optically connecting to a PLC chip.

In various embodiments, after the light passes from the PLC waveguide to the photo detector on the SiPh chip, the light will be detected to reconvert the data into electronic form. The detector, based on metal-semiconductor junctions, with germanium as the semiconductor, can be integrated into the SiPh waveguide. The detector should be designed such that it is equally sensitive to all modes propagating in the silicon photonics waveguide.

In various embodiments, the PLC chip can be used to multiplex, demultiplex, switch, and couple to other chips.

In various embodiments, the waveguide of the PLC chip can support multiple modes so that $MFD_x \neq MFD_y$.

In various embodiments, coupling the PLC chip to the SiPh chip leads to low optical loss and provide better tolerance of the misalignment.

In various embodiments, coupling the PLC chip to the SiPh chip uses a turning mirror.

In various embodiments, the grating coupling technique can be used to couple the PLC chip to the SiPh chip, where the grating coupler is implemented on the SiPh chip to allow for multimode coupling to and from the chip.

In various embodiments, the edge coupling technique can be used to couple the PLC chip to the SiPh chip, where elliptically shaped single or multimode signals can be used for more efficient coupling between the PLC and SiPh chips.

As used herein, a given signal is "responsive" to a predecessor signal if the predecessor signal influenced the given signal. If there is an intervening processing element, step or time period, the given signal can still be "responsive" to the predecessor signal. If the intervening processing element or step combines more than one signal, the signal output of the processing element or step is considered "responsive" to each of the signal inputs. If the given signal is the same as the predecessor signal, this is merely a degenerate case in which the given signal is still considered to be "responsive" to the predecessor signal. "Dependency" of a given signal upon another signal is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. An integrated optical device, comprising:
   a planar lightwave circuit (PLC) chip;
   a silicon photonic (SiPh) chip attached to the PLC chip;
   a PLC waveguide disposed in the PLC chip and terminating within the PLC chip at an end facet of the PLC waveguide;
   a SiPh waveguide disposed in the SiPh chip and including an out-of-plane grating which diffracts light from the SiPh waveguide away from the SiPh chip and toward the PLC chip; and
   a turning mirror in the PLC chip disposed and oriented to reflect light emitted from the grating onto the end facet of the PLC waveguide, an optical path being defined by the grating and the end facet of the PLC waveguide and including the turning mirror,
   wherein the grating is designed to focus light emitted from the out-of-plane grating at a focal plane that is spaced from the grating along the optical path, the focal plane further being within one Rayleigh distance, along the optical path, of the end facet of the PLC waveguide.

2. The device of claim 1, wherein the PLC waveguide and the SiPh waveguide each has respective longitudinal an transverse dimensions,
   and wherein the PLC waveguide and the SiPh waveguide both support more than one mode in their respective transverse dimensions.

3. The device of claim 1, wherein the PLC waveguide includes, longitudinally adjacent to the end facet of the PLC waveguide, a mode field converter configured to convert light having the first mode field shape in the PLC waveguide to light having the second mode field shape in the SiPh waveguide and vice-versa.

4. The device of claim 1, wherein the turning mirror comprises the end facet of the PLC waveguide, the end facet of the PLC waveguide being polished and angled to reflect light emitted from the grating onto the end facet of the PLC waveguide.

5. The device of claim 1, wherein the PLC waveguide terminates short of an edge facet of the PLC chip,
   wherein the turning mirror comprises the edge facet of the PLC chip, the edge facet of the PLC chip being polished and angled to reflect light emitted from the grating into the end facet of the PLC waveguide.

6. The device of claim 1, wherein the PLC waveguide end facet coincides with a first sidewall of a recess in the PLC chip, the recess opening toward the SiPh chip, the recess having a second sidewall disposed across the recess from the first sidewall and angled to form the turning mirror.

7. The device of claim 1, wherein the SiPh chip is disposed in a plane parallel to the PLC chip.

8. The device of claim 1, wherein the PLC waveguide supports a single optical mode having a first mode field shape,
   wherein the SiPh waveguide supports a single optical mode having a second mode field shape different from the first mode field shape,
   and wherein the coupler comprises a mode field converter configured to convert light having the first mode field shape in the PLC waveguide to light having the second mode field shape in the SiPh waveguide and vice-versa.

9. The device of claim 8, wherein the mode field in the PLC waveguide has a transverse diameter Yplc and the mode field in the SiPh waveguide has a transverse diameter Ysiph≠Ypls,
   wherein the coupler comprises a terminal section of the PLC waveguide, the terminal section having a longitudinally segmented waveguide core with a plurality of core segments separated by cladding regions, the terminal section having a first end disposed in optical communication with the PLC waveguide and a second end longitudinally opposite the first end and disposed in optical communication with the SiPh waveguide,
   and wherein the core segments have respective transverse widths which vary gradually from a first width at the first end, the first width supporting the mode field having transverse diameter Ypls, to a second width at the second end, the second width supporting the mode field having transverse diameter Ysiph.

10. An integrated optical device comprising:
    a planar lightwave circuit (PLC) chip;
    a silicon photonic (SiPh) chip attached to the PLC chip;
    a PLC waveguide having longitudinal and transverse dimensions and being disposed in the PLC chip;
    a SiPh waveguide having longitudinal and transverse dimensions and being disposed in the SiPh chip; and
    a coupler configured to couple light from the PLC waveguide into the SiPh waveguide and vice-versa,
    wherein the PLC waveguide and the SiPh waveguide both support more than one mode in their respective transverse dimensions,
    and wherein the SiPh chip further includes an optical detector positioned to receive light from the SiPh waveguide.

11. The device of claim 10, wherein the PLC waveguide and the SiPh waveguide are butt coupled with index matching glue, and wherein the coupler comprises the index matching glue.

12. The device of claim 10, wherein the coupler comprises an out-of-plane grating in the SiPh waveguide and a turning mirror in the PLC chip, the grating and the turning mirror being configured so that light diffracted out of the SiPh waveguide is directed into the PLC waveguide and vice-versa.

13. The device of claim 10, wherein the PLC chip further comprises an optical demultiplexer having an input end and an output end, the input end having a single mode input waveguide for carrying an input WDM optical signal, and the output end having a plurality of output multimode waveguides in the PLC chip each for carrying optical energy demultiplexed from the input WDM signal, one of the output multimode waveguides being the PLC waveguide.

14. The device of claim 10, wherein the PLC chip further comprises an optical processing function having an input end and an output end, the input end being disposed to receive light from a single mode input waveguide, and the output end supporting more than one mode and positioned to deliver optical energy into the PLC waveguide.

* * * * *